Oct. 28, 1952     G. H. HUBER     2,615,554
VERTICAL BALE ELEVATOR
Filed May 4, 1950     2 SHEETS—SHEET 2

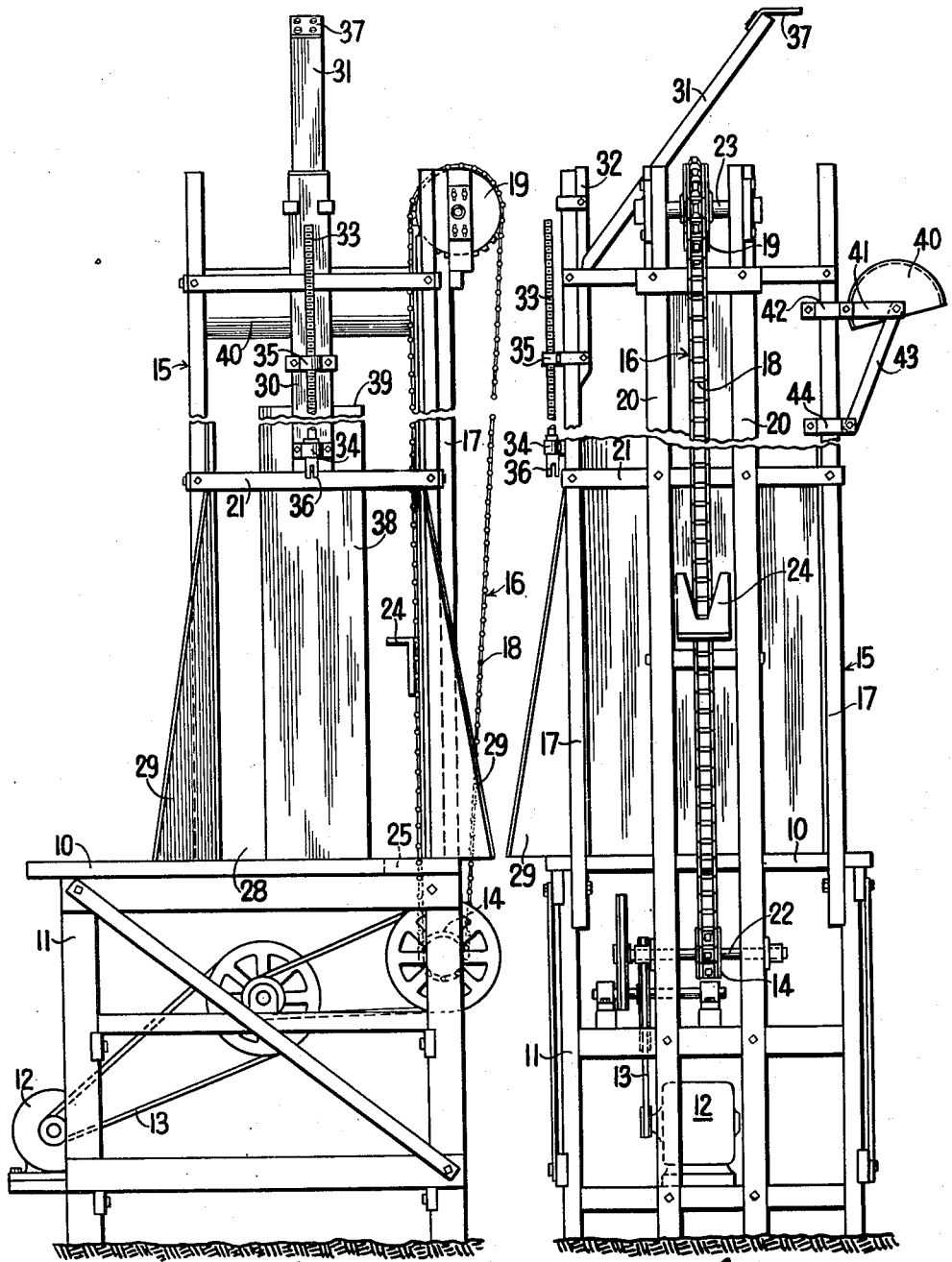

INVENTOR.
Gilbert H. Huber
BY
Corbett, Mahony + Miller
ATTORNEYS

Patented Oct. 28, 1952

2,615,554

UNITED STATES PATENT OFFICE 2,615,554

VERTICAL BALE ELEVATOR

Gilbert H. Huber, Crestline, Ohio

Application May 4, 1950, Serial No. 159,975

9 Claims. (Cl. 198—28)

My invention relates to a vertical bale elevator. It has to do, more particularly, with an elevator which is especially useful in transferring bales of hay, straw, et cetera, from a lower level to an upper level. It is designed specifically for use in barns or similar farm buildings for receiving the bales at wagon-bed or truck-bed level and elevating them to loft level.

One of the most important objects of my invention is to provide a bale elevator which occupies a minimum amount of space so that it will not interfere with other activities at the ground floor level of the barn and so that it will extend up through the usual loft opening.

Another object of my invention is to provide an elevator which is so designed that it can be operated by one man who will load the elevator, the elevator automatically discharging the bales into the loft.

Another important object of my invention is to provide an elevator of the type indicated which can be adjusted in accordance with lofts of varying elevation.

A further object of my invention is to provide a bale elevator which is of extremely simple and inexpensive structure.

Another object of my invention is to provide a bale elevator which is so designed as to require a minimum amount of power to operate.

A further object of my invention is to provide a bale elevator which is relatively light in structure so that it can be moved from one location to another if necessary.

According to my invention, I provide a bale elevator which consists of a loading platform at a suitable level, for example, at wagon-bed or truck-bed level. Extending upwardly from this bed is a simple shaft which is vertically disposed. Associated with one side of this shaft is elevating means in the form of an endless chain which carries bale-engaging cleats. On their upward travel, these cleats engage excessive bales which are positioned on the platform and elevate them through the shaft. Associated with the upper end of the shaft is a bale deflector or guide which extends into the shaft and which will deflect the bales through a suitable opening at one side of the shaft onto the floor of the loft or other platform or receiving surface. The bale deflector is vertically adjustable so that it can be properly positioned relative to lofts at varying elevations.

The preferred embodiment of my invention is illustrated in the accompanying drawings wherein similar characters of reference designate corresponding parts and wherein:

Figure 1 is a side elevational view of an elevator constructed according to my invention showing the loading side.

Figure 2 is a view at right angles to Figure 1 showing the side of the elevator which carries the endless chain elevating means.

Figure 4:
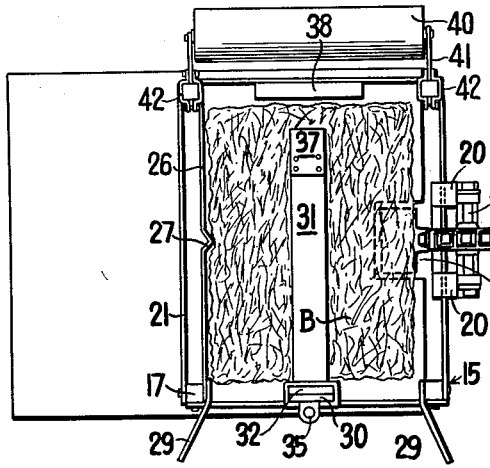
Figure 4 is a plan view of the elevator.

With reference to the drawings, I have illustrated my elevator as comprising a loading platform 10 which is supported at a suitable level on framework 11. This framework beneath the platform 10 carries the driving means which may be in the form of an electric motor 12 or any other suitable power means. The motor 12 through suitable speed reduction belt drives 13 drives the sprocket 14 which is part of the elevating means to be described subsequently.

Extending upwardly from the platform 10 is a vertical shaft indicated generally by the numeral 15. It will be noted that the platform 10 extends to the left (Figure 1) beyond the shaft so as to prevent tipping of the shaft since the force exerted by the elevating means will be towards that side, the elevating means being located on the right hand side of the shaft, and being in the form of an endless chain conveyor indicated generally by the numeral 16.

The shaft 15 comprises the four vertical posts or rails 17 which have their lower ends rigidly secured to the platform 10 and frame 11. These vertical members 17 are arranged at each corner of the shaft and spaced properly to receive therebetween the standard size bale B supported on end, as shown in Figure 4. As previously indicated, the endless chain conveyor 16 is disposed at one side of the shaft. This conveyor comprises an endless sprocket type chain 18 which is carried by the driving sprocket 14 at the lower end of the shaft and the idler sprocket 19 at the upper end of the shaft. The chain 18 travels between the vertical columns 20 which are laterally spaced and are rigidly secured to each other and to the adjacent vertical rails 17 by means of a plurality of transverse braces 21 located at suitable levels. The sprocket 14 is supported by a short transverse shaft 22 mounted in suitable bearings and members 20 while the sprocket 19 is similarly supported by a transverse shaft 23. At suitable intervals along the chain, it is provided with bale-engaging cleats 24 which project outwardly therefrom. These cleats will be spaced a distance greater than the length of a bale. The platform is provided with a suitable opening 25 to permit movement of the cleats 24 upwardly therethrough.

The opposite or left-hand side of the shaft is provided with a bearing plate 26 that provides a guiding surface against which the bales are forced during their upward travel. Obviously when a bale is in the shaft and is being lifted by the conveyor 16, there is a thrust on the bale towards the left. This thrust is taken by the plate 26 which provides a bearing surface along which the one side of the bale slides. This plate 26 may be formed of sheet metal and may be suitably secured to the inner edges of the rails 17 at that side of the shaft. To reinforce this plate a V-shaped vertically extending rib 27 is provided midway between its edges. This rib 27 projects inwardly and will also serve as guide means for the bales, as shown in Figure 4, since the rib will extend into the compressible material of the bale when it is forced thereagainst by the conveyor.

The front side of the shaft 15 is open adjacent its lower end so as to provide an opening 28 of suitable height through which the bales may be pushed on end over the surface of the platform into the shaft. For guiding the bales into the shaft, diverging guide wings 29 are provided at each side of the opening 28 and extend outwardly therefrom. Above the opening 28 midway between the rails 17 at the front of the shaft a guide board 30 is provided which extends from the opening 28 to the top of the shaft. On the upper portion of this board 30 a bale deflecting member 31 is located. This member 31 is carried by a slide member 32 which is mounted for vertical sliding movement on the board 30. The member 32 is moved vertically by a screw 33 which is rotatably anchored at 34 to the lower end of the board 30 and is threaded through a bracket 35 carried on the lower end of slide 32. The screw 33 can be located by a crank supplied to its lower end 36 so as to move the deflector 31 vertically. The deflector 31 extends inwardly into the shaft almost to the opposite side thereof and is provided with a bracket on its upper end which has a horizontal portion 37.

The side of the shaft 15 opposite the loading side thereof is also provided with a guide board, as shown best in Figure 4. This guide board is indicated by the numeral 38 and extends from the platform 10 upwardly to a point 39 spaced from the upper end of the shaft, this point being spaced above the lower end of the opposed guide board 30. Above the upper end of the board 38 is a guide member 40 which extends transversely of the shaft. This guide member 40 is preferably formed of sheet metal and is of semi-circular cross-section. It is rigidly carried by brackets 41 which are clamped to vertical rails 17 by means of clamps 42. Angle braces 43 have their upper ends connected to the outer ends of brackets 41 and their lower ends clamped to rails 17 by clamps 44. The guide member 40 may, therefore, be adjusted vertically by releasing clamps 42 and 44 and sliding them vertically on rails 17, in accordance with the vertical position of the deflector 31. As the bales of hay are deflected by member 31, they slide over the member 40.

Figure 5:
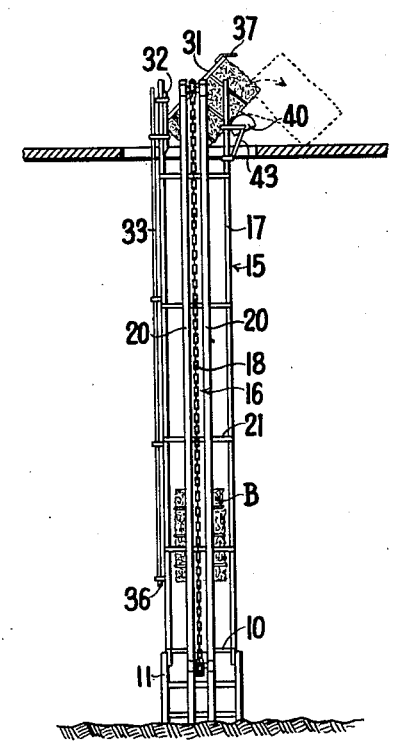
Figure 5 is a diagrammatic view illustrating the operation of the elevator.
Figure 3:
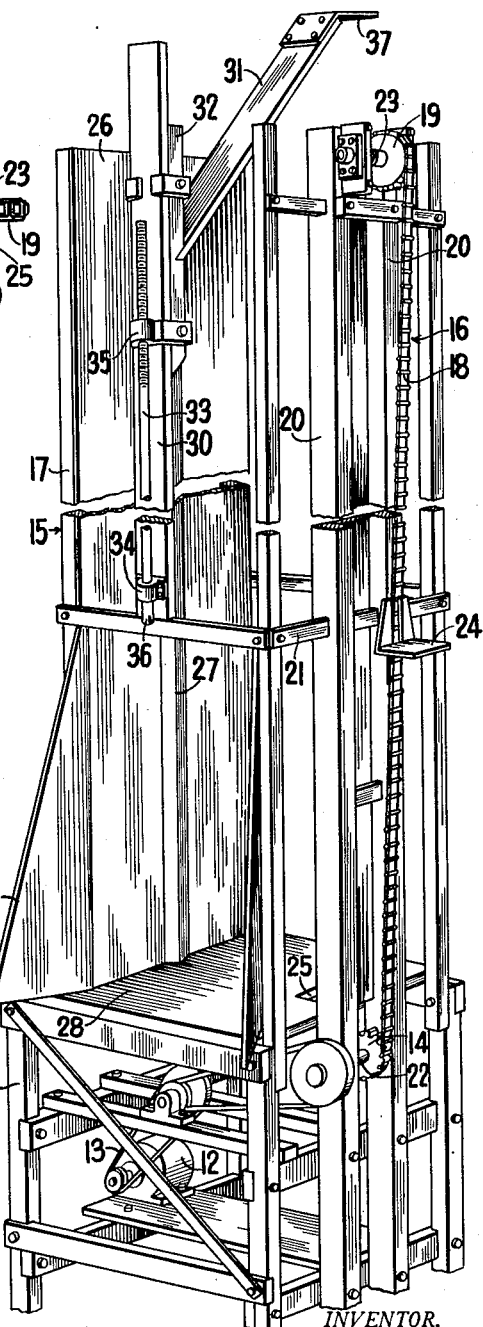
Figure 3 is a perspective view of the elevator showing the loading and endless chain conveyor side.

The use of my elevator is illustrated diagrammatically in Figure 5. A bale of hay is slipped through the opening 28 at the front of the shaft on end onto the platform 10. The lower end of the bale can slide on the platform into position where it is centered within the shaft, as shown in Figure 4. The lower end of the bale will be engaged by the next arriving cleat 24 of the conveyor and will be lifted through the shaft. As it is lifted, the conveyor exerts a thrust on the right hand side of the bale (Figure 1) and presses it against the bearing plate 26 at the left hand side of the shaft. The rib 27 will aid in preventing the bale from tipping forwardly until it passes beyond the opening 28. As the bale nears the upper end of the shaft, its upper end engages the deflector 31 and it is gradually tipped rearwardly onto the member 40 over which it will slide and drop into the loft. As previously indicated, deflector 31 and guide member 40 can be adjusted vertically in accordance with the height of the loft.

Figure 6:
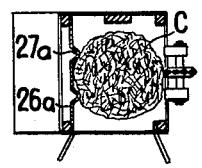
Figure 6 is a horizontal sectional view illustrating a change in the shaft so that the elevator can handle circular bales.

In Figure 6, I have illustrated an arrangement which can handle circular bales C. This structure is exactly the same as before except that the plate corresponding to plate 26 is of different form. In this instance, the plate is provided with two laterally spaced vertical ribs 26a and 27a which form a trough-like guide for the circular bale.

It will be apparent from the above description that I have provided a simple elevator for handling bales of hay or the like. The elevator can be operated by one man who will be at the lower level and will merely load the bales on the platform. A minimum amount of space is required for the elevator since it is vertically disposed and, therefore, does not require space like an inclined drag conveyor. The structure is such that it can be operated with a minimum amount of power.

Various other advantages will be apparent.

Having thus described my invention, what I claim is:

1. A baled hay elevator comprising a perpendicularly disposed shaft, an endless chain extending vertically at one side of said shaft and having bale-engaging members projecting into the shaft, a vertical bearing plate at the opposite side of the shaft for engaging the opposite side of the bales, an inlet opening at the lower end of the shaft and at the forward side thereof, the rear side of the shaft at its upper end being provided with a discharge opening, a deflector mounted on the upper portion of the shaft and projecting into the shaft towards the rear side of the shaft where said discharge opening is provided for deflecting bales from the shaft through said opening, and means for mounting said deflector for vertical movement on the shaft.

2. An elevator according to claim 1 wherein a horizontal guide member is provided opposite and below the deflector on the rear side of the shaft for engaging the bales as they are deflected by the deflector.

3. An elevator according to claim 2 wherein said guide is vertically adjustable on the shaft.

4. An elevator according to claim 3 wherein the bearing plate opposite the endless chain conveyor is provided with a vertical rib intermediate its edges.

5. An elevator according to claim 4 wherein the bearing plate is provided with a central guide trough intermediate its edges.

6. An elevator according to claim 5 wherein the inlet opening at the lower end of the shaft is provided with guide wings for directing bales thereinto.

7. An elevator according to claim 6 wherein the shaft is mounted on the upper side of a platform.

8. An elevator according to claim 7 wherein the shaft is offset on the platform towards the side where said endless chain is disposed.

9. An elevator according to claim 8 wherein said platform is supported by a frame at a suitable level, and driving means for the endless chain mounted on said frame.

GILBERT H. HUBER.

REFERENCES CITED

The following references are of record in the file of this patent:

UNITED STATES PATENTS

| Number | Name | Date |
|---|---|---|
| 1,193,118 | Buck | Aug. 1, 1916 |
| 1,494,343 | Culbertson | May 20, 1924 |
| 1,705,010 | Garvey et al. | Mar. 12, 1929 |
| 2,372,902 | Lewis | Apr. 3, 1945 |